(12) United States Patent
Tsuji

(10) Patent No.: US 8,092,725 B2
(45) Date of Patent: Jan. 10, 2012

(54) APPARATUS AND METHOD FOR FORMING OPTICAL ELEMENT

(75) Inventor: Takumi Tsuji, Ibaraki (JP)

(73) Assignee: Sony Corporation, Tokyo (JP)

( * ) Notice: Subject to any disclaimer, the term of this patent is extended or adjusted under 35 U.S.C. 154(b) by 795 days.

(21) Appl. No.: 11/785,954

(22) Filed: Apr. 23, 2007

(65) Prior Publication Data

US 2007/0252294 A1 Nov. 1, 2007

(30) Foreign Application Priority Data

Apr. 28, 2006 (JP) ................ 2006-124771

(51) Int. Cl.
*B29D 11/00* (2006.01)
(52) U.S. Cl. ......... 264/1.38; 264/1.7; 264/2.5; 425/117; 425/174.4; 425/175; 425/808
(58) Field of Classification Search .............. 264/1.1, 264/1.36, 1.38, 1.7, 2.5; 425/174.4, 808, 425/110, 117, 175; 351/159, 178
See application file for complete search history.

(56) References Cited

U.S. PATENT DOCUMENTS 5,762,836 A * 6/1998 Bos et al. ............ 264/1.7

FOREIGN PATENT DOCUMENTS

| JP | 01-286808 A | 11/1989 |
|---|---|---|
| JP | 2002-148501 A | 5/2002 |
| JP | 2006-163126 A | 6/2006 |
| JP | 2006-251543 A | 9/2006 |

OTHER PUBLICATIONS

Japanese Office Action issued Aug. 30, 2011 for corresponding Japanese Application No. 2006-124771.

* cited by examiner

*Primary Examiner* — Mathieu D. Vargot
(74) *Attorney, Agent, or Firm* — Rader, Fishman & Grauer PLLC

(57) ABSTRACT

An apparatus for forming an optical element. The apparatus includes a pair of forming molds each of which has a facing surface facing each other. At least one of the pair of the forming molds is made so as to allow a hardening energy to pass through itself. A frame-like mold member is provided so as to be interposed between the facing surfaces of the pair of the forming molds to cover an outer peripheral portion which each of the forming molds has on its facing surface, thereby defining a cavity. In the thus arranged apparatus, an energy hardening resin is filled into the cavity and then hardened by being subjected to the hardening energy passing through the at least one of the pair of the forming molds.

8 Claims, 17 Drawing Sheets

FIG. 3

| STEP 1 | MOLD MEMBER-ASSEMBLING PROCESS |
| STEP 2 | MOLD MEMBER-CLAMPING PROCESS |
| STEP 3 | RESIN FILLNG PROCESS |
| STEP 4 | HARDENING ENERGY-IRRADIATION PROCESS |
| STEP 5 | COOLING AND RELEASING PROCESS |

FIG. 10
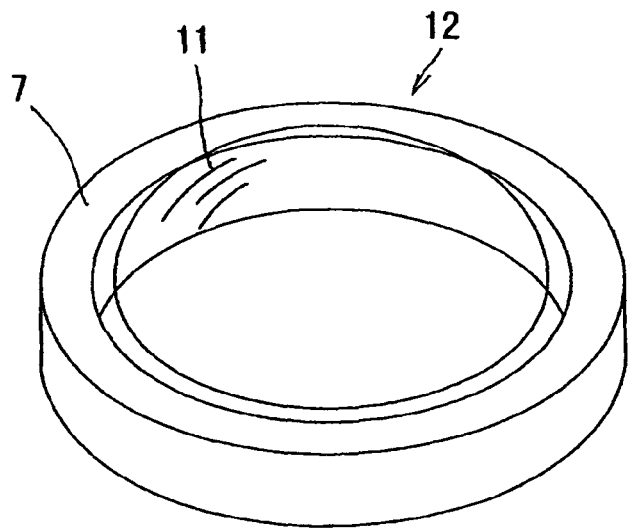
FIG. 11A
FIG. 11B
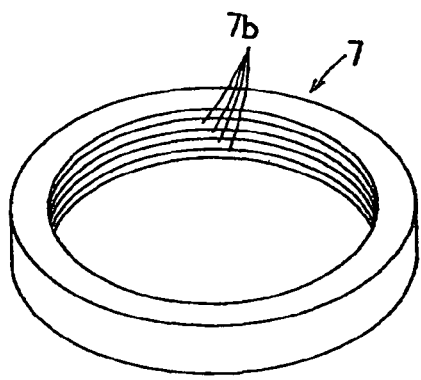 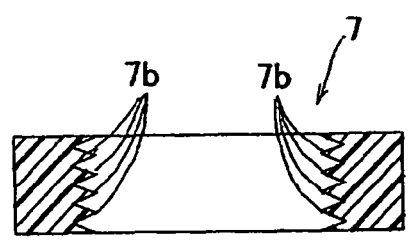
FIG. 12A
FIG. 12B
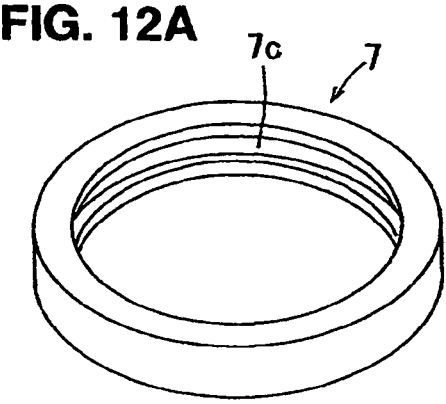 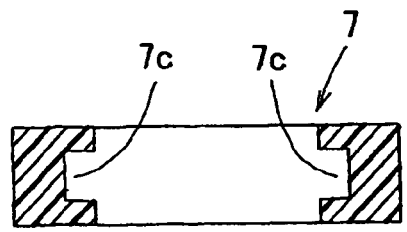

APPARATUS AND METHOD FOR FORMING OPTICAL ELEMENT

CROSS REFERENCES TO RELATED APPLICATIONS

The present invention contains subject matter related to Japanese Patent Application JP 2006-124771 filed in the Japanese Patent Office on Apr. 28, 2006, the entire contents of which being incorporated herein by reference.

BACKGROUND OF THE INVENTION

This invention relates to an apparatus and method for forming an optical element made of an ultraviolet hardening resin.

Optical elements, such as lenses used in optical devices including cameras and the like, are commonly made of glass or plastic. The optical elements made of plastic are light in weight, and are excellent in impact resistance and manufacturing cost as compared with those made of glass. Hence, the optical elements made of plastic are widely applied to numerous kinds of optical devices.

The optical elements made of plastic are known to be formed by using a thermoplastic resin, a thermosetting resin, or the ultraviolet hardening resin.

The optical elements made of the thermoplastic resin are formed by injection molding from the thermoplastic resin such as polymethyl methacrylate (PMMA) and polycarbonate (PC). In this method, there are drawbacks in internal homogeneity and in ability of transcribing the lens surface while mass production can be allowed for a short period of time.

The optical elements made of the thermosetting resin are formed by heat-polymerizing the thermosetting resin such as diethylene glycol bisaryl carbonate (CR-39) in a casting. This method is excellent in internal homogeneity and in ability of transcribing the lens surface; however, the method has a drawback of being poor in ability of mass production since it takes several hours and by extension several tens of hours for polymerization. In order to overcome the drawback encountered in the heat-polymerization in the liquid injection molding, a method for mass-producing the optical elements such as lens for a short period of time has been variously proposed, in which ultraviolet light is applied to the ultraviolet hardening resin from a light source such as a high-pressure mercury-vapor lamp and a metal halide lamp so as to induce polymerization to harden the ultraviolet hardening resin.

In the above-mentioned method for forming the optical elements in the use of the ultraviolet hardening resin, as a matter of course it is necessary to employ a forming mold through which ultraviolet light can be transmitted, such as glass. This is disclosed in Japanese Patent Provisional Publications Nos. 55-132221, 07-100835 and 08-1807, for example.

SUMMARY OF THE INVENTION

As has been discussed above it is necessary to employ a forming mold made of a transparent glass through which ultraviolet light can be transmitted in the apparatus and method for forming the optical element made of the ultraviolet hardening resin, which raises problems as will be discussed hereinafter.

(i) In a case of forming a lens 101 as shown in FIG. 29, it is required to shape an outermost peripheral portion that each of a pair of forming molds 102, 103 has on a surface facing to each other into an edge as shown in FIG. 30, the surfaces of the forming molds 102, 103 defining a cavity. When the forming molds 102, 103 are made of glass, the glass is fragile and tends to splinter so as to be subject to a fine deficit or chip 105, a crack 106 or the like at the outermost peripheral portion as shown in FIG. 31. When the lens 101 is formed in the use of the forming mold having the deficit 105, a so-called burr 107 occurs on the lens 101 as shown in FIG. 32, thereby degrading the quality of the lens 101.

(ii) In a case of installation the lens 101 to a lens barrel, the lens 101 having the burr 107 that occurs on an installation base surface where the lens 101 is installed to a barrel of a camera or the like, the lens 101 is so inclined inside a lens barrel 108 as to bring about deviation of an optical axis 109 as shown in FIG. 33, thereby requiring a deburring operation. As a method for preventing the deviation of the optical axis 109 without removing the burr 107, a clearance 110 for accommodating the burr 107 therein may be produced inside the lens barrel 108 as shown in FIG. 34. However, this complicates the design of the lens barrel 108 and degrades flexibility in design.

(iii) In the use of the forming molds 102, 103 having the crack 106, a molten resin flows into the fine crack 106 during an operation of filling the molten resin into the forming molds. Then, at the time of hardening and shrink of the resin, a part of the forming mold is to peel off at a portion having the crack 106. This phenomenon becomes conspicuous with increase of the amount of the resin that flows into the crack 106, because an absolute amount of shrink is to increase as the amount of the resin is increased.

In view of the above, it is desirable to provide an apparatus and method for forming the optical element such as the lens, in which the deficit or crack (which is the biggest drawback that the forming mold made of glass or the like possesses) is difficult to adversely affect the product even if the deficit or crack occurs.

Additionally, it is desirable to provide an apparatus and method for forming the optical element such as the lens, in which the deburring operation after a forming operation may be not necessary.

In an apparatus for forming an optical element, according to an embodiment of the present invention, each of a pair of forming molds has a facing surface facing to each other. At least one of the pair of the forming molds allows a hardening energy to pass through itself. A frame-like mold member is provided to be interposed between the facing surfaces of the pair of the forming molds so as to cover an outer peripheral portion that each of the forming molds has on its facing surface, thereby defining a cavity. Then, an energy hardening resin is filled into the cavity and then hardened by being subjected to the hardening energy passing through the at least one of the pair of the forming molds.

Additionally, a method for forming the optical element according to the embodiment of the present invention includes the steps of: (a) preparing a pair of forming molds each of which has a facing surface facing to each other, at least one of the pair of the forming molds allowing a hardening energy to pass through itself; (b) interposing a mold member between the facing surfaces of the pair of the forming molds in a manner that each bottom surface of the mold member covers an outer peripheral portion that each of the forming molds has on its facing surface, thereby defining a cavity; (c) filling an energy hardening resin into the cavity; and (d) hardening the energy hardening resin by applying the hardening energy thereto, thereby forming a formed resinous article inside the frame-like mold member.

In the apparatus for forming the optical element, according to the embodiment of the present invention, the mold member interposed between the facing surfaces of the pair of the forming molds is arranged to cover an outer peripheral portion that each of the forming molds has on its facing surface. Therefore, even if a fine damage such as a chip exists on the outer peripheral portion of the facing surface, the formed optical element can be prevented from a burr to be brought by the damage. Further, even if there is a crack on the outermost peripheral portion of the facing surface of the forming mold, the molten resin is prevented from flowing into the crack. This protects the forming mold from a situation where a part of the forming mold is peeled off in the vicinity of the crack when the resin hardens and shrinks.

The method for forming the optical element according to the embodiment of the present invention is a simple method, in which the optical element is formed upon interposing the mold member between the outer peripheral portions of the facing surfaces of the pair of the forming molds. In this method it is allowed to form the optical element while protecting the facing surfaces of the pair of the forming molds at its outermost peripheral portion by the mold member. It is further possible to form such an optical element as to be free from the burr and the like, even if there is a deficit or crack on the outermost peripheral portion of the facing surface of each of the pair of the forming molds.

The burr in the lens can bring a flare even if it occurs outside the optical effective diameter portion of the lens, because lights which pass through the outside of the optical effective diameter portion of the lens is diffused by the burr so as to return into the optical effective diameter portion. However, the apparatus and method according to the embodiment of the present invention reliably prevent the occurrence of burr, so that the flare is difficult to occur in the above-discussed phenomenon. Further, the outermost peripheral portion of the facing surface of the forming mold is not required to be shaped into an edge, and can be chamfered to any desired shape. More specifically, the outermost peripheral portion of the facing surface of the forming mold may be chamfered to have so-called "C-surface" in such a manner as to form a part of an imaginary cone, or may be chamfered to form so-called "R-surface" having a radius of curvature. With this, the forming mold is improved in strength and reduced in risk of breakage. This results in not only a long life of the forming mold, but also a cost cutting in the sense of reducing the number of changeovers. Furthermore, resin is to unavoidably shrink during its hardening so that accuracies of an optical axis and eccentricity may not be ensured in a state where the resin shrinks, and therefore a centering operation is to be required in order to obtain a dimension precise enough to be an installation base against the barrel. However, the apparatus and method according to the embodiment of the present invention employs the mold member assured of its outer dimension so as to improve an accuracy of the outer dimension of the optical element, thereby accomplishing high accuracies of the optical axis and eccentricity.

BRIEF DESCRIPTION OF THE DRAWING

FIG. 3 is a flow chart of steps taken for forming the optical element;

FIG. 10 is a perspective view of the formed optical element;

FIG. 11A is a perspective view of a first modification of the mold member;

FIG. 11B is a cross-sectional view of the first modification of the mold member;

FIG. 12A is a perspective view of a second modification of the mold member;

FIG. 12B is a cross-sectional view of the second modification of the mold member;

DETAILED DESCRIPTION OF THE INVENTION

Figure 1:
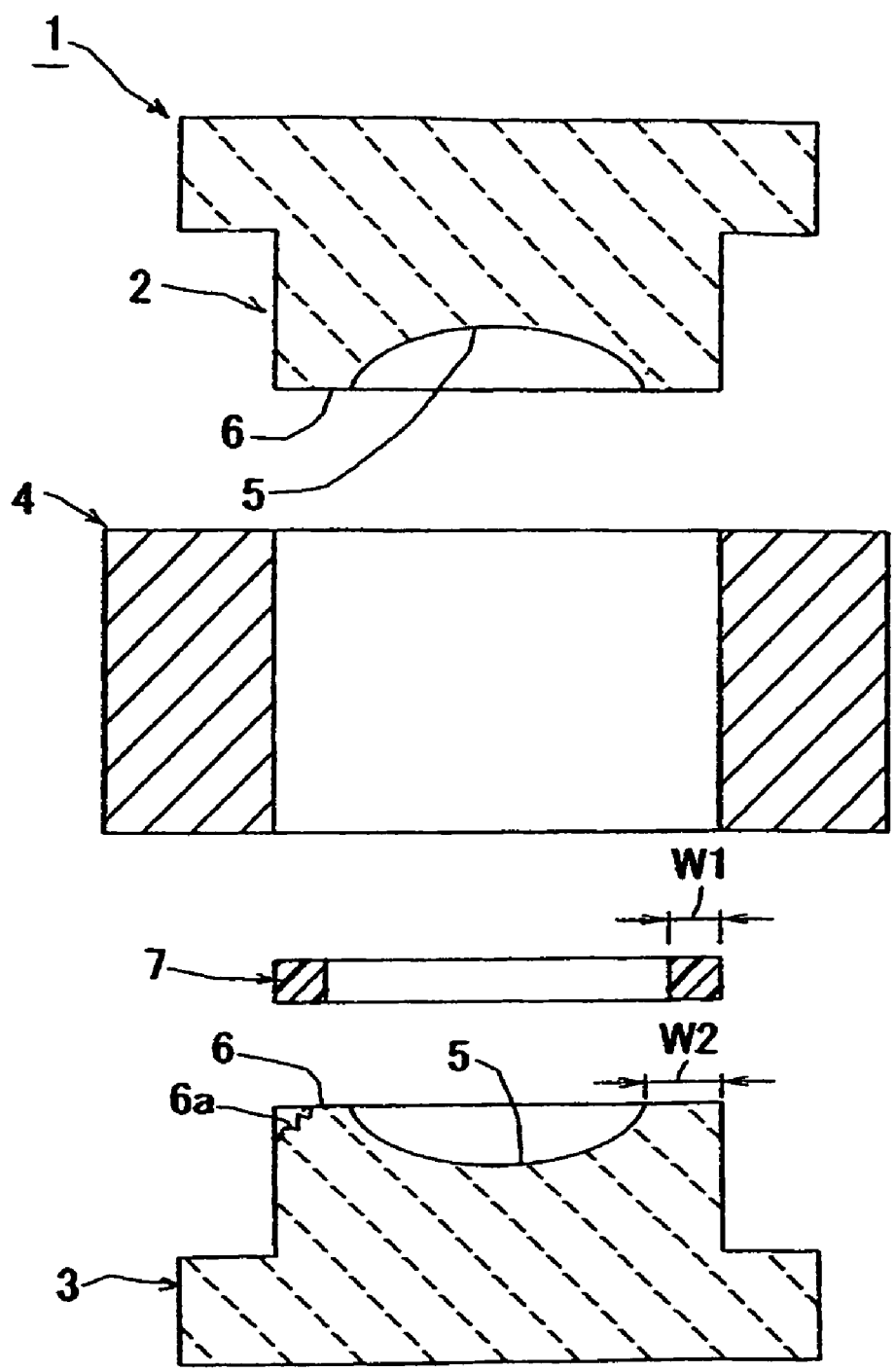
FIG. 1 is a schematic cross-sectional view of an apparatus for forming an optical element, according to an embodiment of the present invention.
Figure 2:
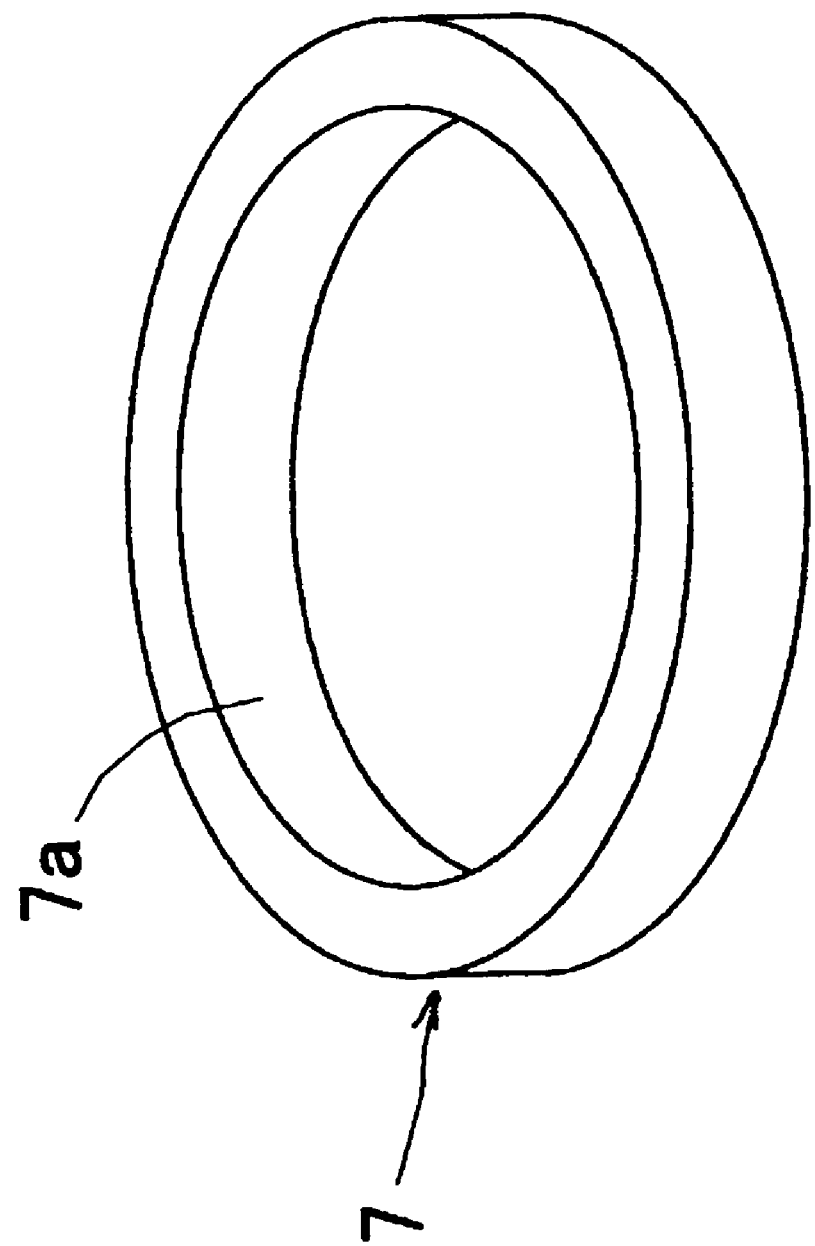
FIG. 2 is a perspective view of a frame-like mold member.

Referring now to the accompanying drawings, an embodiment of an apparatus and method for forming an optical element, according to the present invention will be discussed. FIG. 1 is a cross-sectional view of an embodiment of an apparatus 1 for forming an optical element, according to the present invention. The apparatus 1 will be hereinafter abbreviated as merely "a forming apparatus 1". FIG. 2 is a perspective view of a mold member. FIG. 3 is a flow chart of a forming method. FIGS. 4 to 8 are schematic cross-sectional views showing each step taken for forming the optical element in the use of the forming apparatus 1.

As shown in FIG. 1, the forming apparatus 1 includes a pair of forming molds, i.e. first (or upper) and second (or lower) forming molds 2 and 3, and a sleeve 4 for carrying out a centering of the first and second forming molds 2 and 3. The first and second forming molds 2 and 3 are made of glass through which ultraviolet light can be transmitted. The glass is preferably made of a material high in ultraviolet transmittance, such as synthetic quartz; however, the glass may be made of a material other than synthetic quartz. The first and second forming molds 2 and 3 are adapted to move upward and downward by a mold-moving mechanism omitted from the drawings, so as to be insertable into the sleeve 4.

The first and second forming molds 2 and 3 have lower and upper facing surfaces, respectively. The first and second forming molds 2 and 3 are recessed to have a spherical or aspherical concave surface 5 at a central portion of each of the lower and upper facing surfaces. Each of the lower and upper facing surfaces includes a flat surface 6 serving as an outer periphery of the concave surface 5. An optical effective diameter portion of the optical element is to be defined by the concave surface 5 of both of the first and second forming molds 2 and 3. Additionally, an installation base surface of the optical element is defined by the flat surface 6 with respect to a barrel or the like. In order to improve a releasability of the product, the lower and upper facing surfaces of the first and second forming molds 2 and 3 are coated with a mold release agent such as fluorine, as necessary.

Between the lower and upper facing surfaces of the first and second forming molds 2 and 3, a frame-like mold member 7 is interposed so as to cover an outer peripheral portion that each of the lower and upper facing surfaces of the first and second forming molds 2 and 3 has (or an outer peripheral portion that each flat surface 6 has), and to be charged with an ultraviolet hardening resin serving as an energy hardening resin. The mold member 7 has a width of W1 generally half of width W2 of the flat surface 6. The mold member 7 is adapted to cover damages such as a chip 6a even if the damages are made at the outermost peripheral portion that each of the lower and upper facing surfaces of the first and second forming molds 2 and 3 has.

The frame-like mold member 7 is made of metal or resin and shaped into a ring as shown in FIG. 2. In view of a weight reduction and a pressure application to the optical element to be formed, the mold member 7 is preferably made of a resin having an appropriate elasticity. Further, the mold member 7 may be made of a resin generally equal in linear expansion coefficient to a resin which forms the optical element, thereby minimizing distortion that occurs due to linear expansion. Furthermore, the mold member 7 may be made of a resin having compatibility with the resin which forms the optical element, thereby being formed integral with the optical element. Concerning coloration of the mold member 7, black color is preferable from the viewpoints of prevention of undesired light reflection, and a visual quality of the barrel.

Hereinafter, an example of the method for forming the optical element in the use of the above forming apparatus 1 will be discussed with reference to FIGS. 4 to 8.

Figure 4:
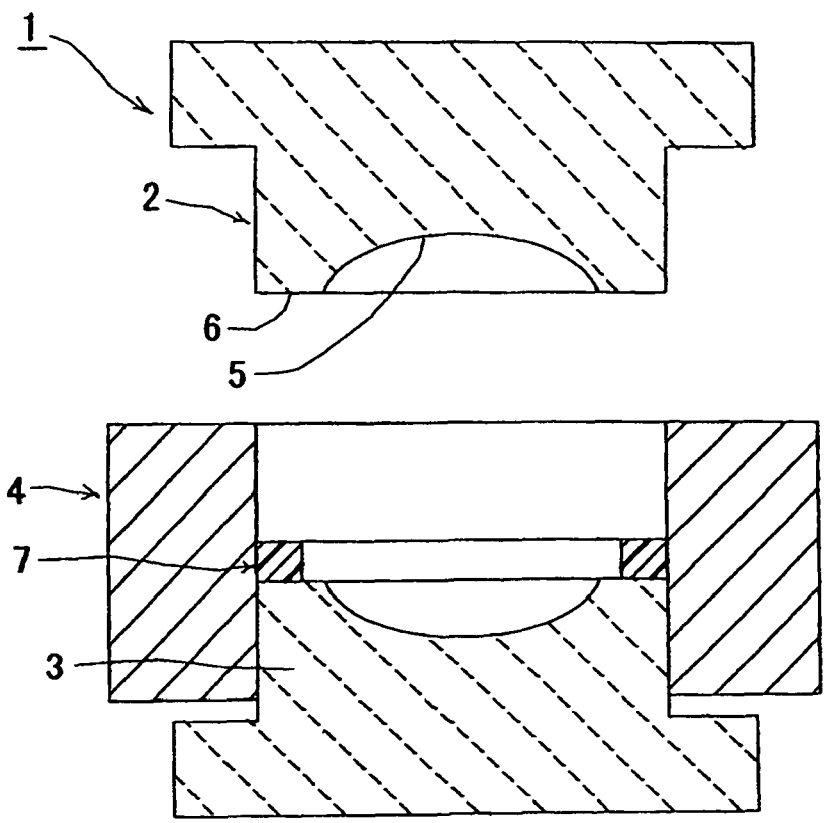
FIG. 4 is a schematic cross-sectional view showing a step taken for forming the optical element.

In FIG. 4 showing a mold member-assembling process as step 1, the mold member 7 is disposed on the upper facing surface of the second forming mold 3. Then, the second forming mold 3 is inserted into the sleeve 4.

Figure 5:
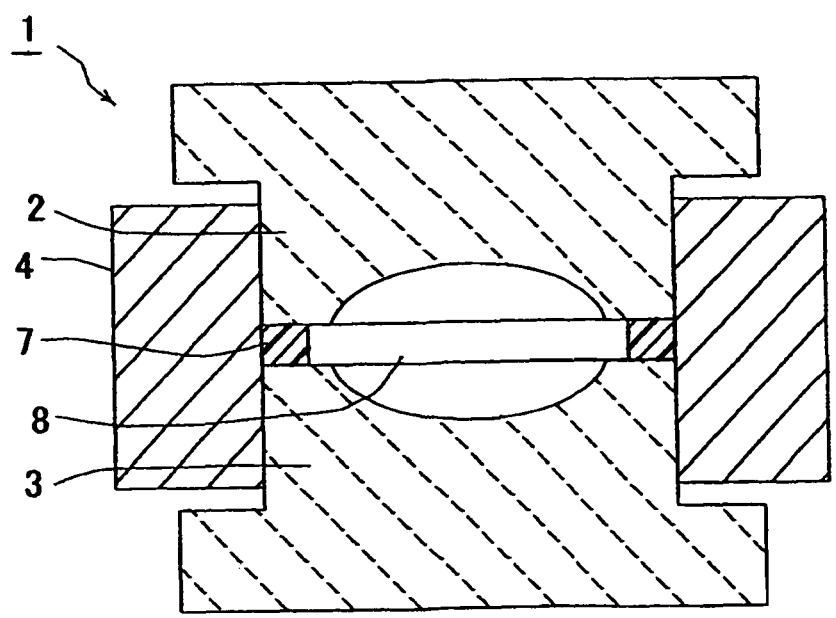
FIG. 5 is a schematic cross-sectional view showing a step taken for forming the optical element.

In FIG. 5 showing a mold member-clamping process as step 2, the first forming mold 2 is inserted into the sleeve 4 so that upper and lower surfaces of the frame-like mold member 7 are clamped by the lower and upper facing surfaces of the first and second forming molds 2 and 3. With this, a resin injection cavity 8 into which the resin is to be injected is defined on an inner periphery side of the mold member 7.

Figure 6:
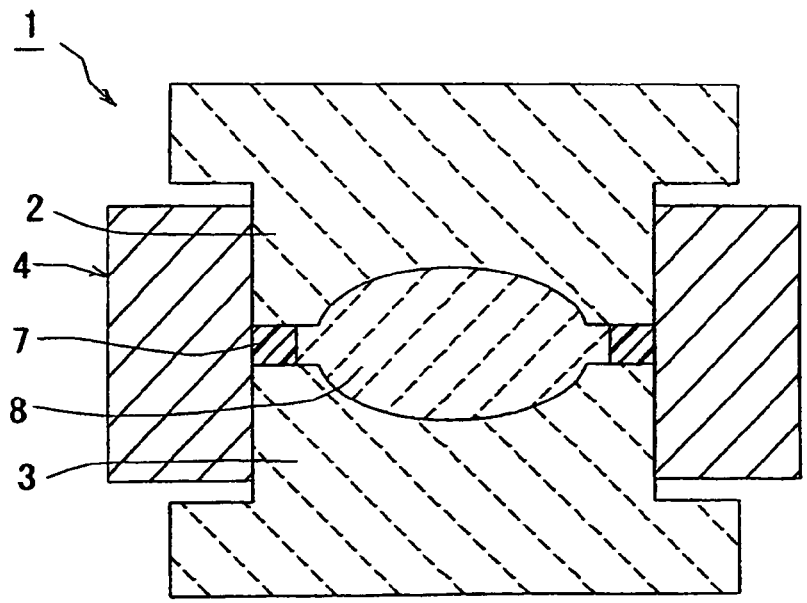
FIG. 6 is a schematic cross-sectional view showing a step taken for forming the optical element.

In FIG. 6 showing a resin filling process as step 3, the resin injection cavity 8 is filled with an ultraviolet hardening resin 9. This filling operation of the ultraviolet hardening resin 9 into the resin injection cavity 8 is carried out by dispensing mechanism (omitted from the drawings).

Figure 7:
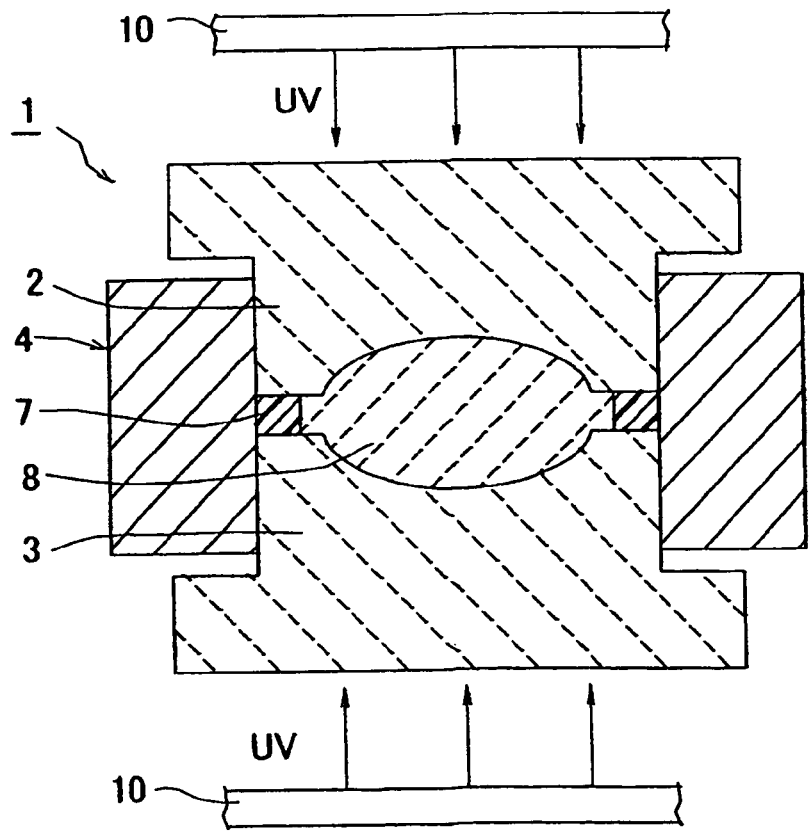
FIG. 7 is a schematic cross-sectional view showing a step taken for forming the optical element.

In FIG. 7 showing a hardening energy-irradiation process as step 4, the ultraviolet hardening resin 9 filled into the resin injection cavity 8 is irradiated with ultraviolet light serving as a hardening energy, by ultraviolet irradiation device 10, thereby to be hardened. The ultraviolet hardening resin 9 often shrinks at the time of hardening, and therefore there arises a fear of a poor surface accuracy in the thus obtained optical element. In order to prevent this, the ultraviolet hardening resin 9 may be subjected to pressure by the first and second forming molds 2 and 3. Further, the ultraviolet hardening resin 9 may be subjected to a heating in addition to ultraviolet irradiation in order to accelerate the hardening activity of the ultraviolet hardening resin 9.

Figure 8:
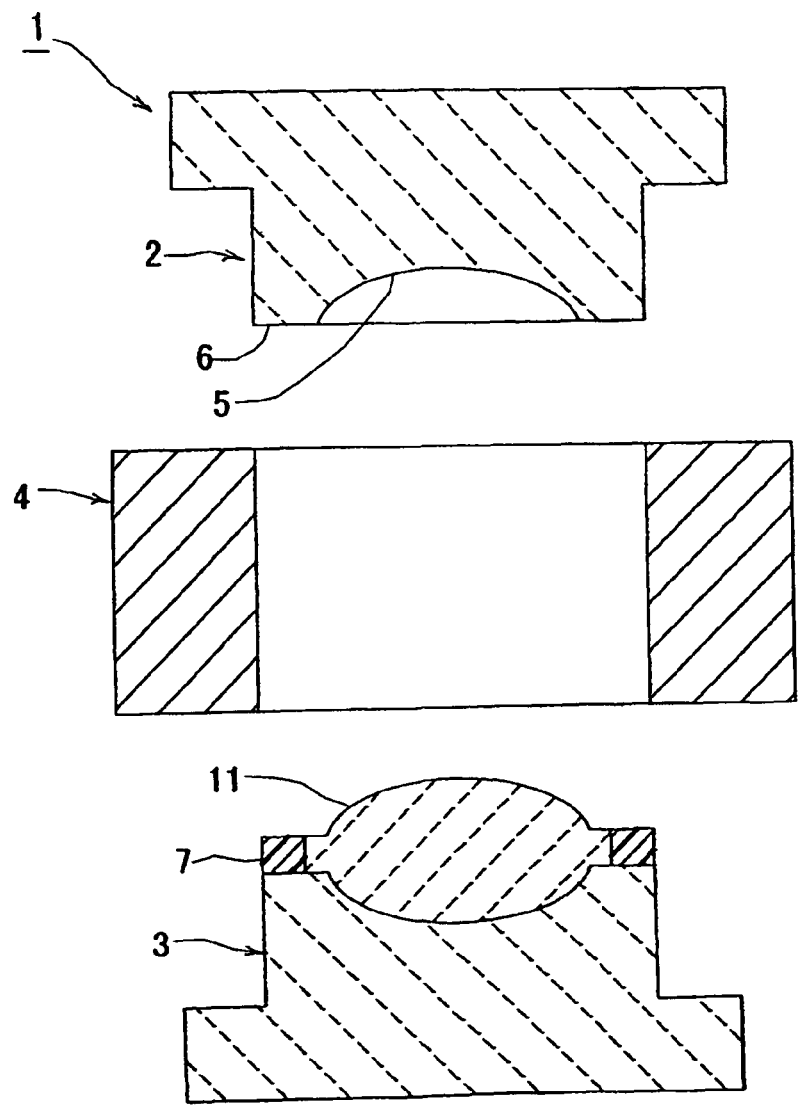
FIG. 8 is a schematic cross-sectional view showing a step taken for forming the optical element.

In FIG. 8 showing a cooling and releasing process as step 5, the first and second forming molds 2 and 3 are pulled out of the sleeve 4 after cooling the ultraviolet hardening resin 9. Thereafter a formed resinous article 11 is released from the second forming mold 3. The formed resinous article 11 is formed integral with the mold member 7 by outsert forming, thereby serving as a biconvex lens or an optical element 12. The thus obtained optical element 12 may be subjected to an annealing treatment for the purposes of removing distortion therefrom or improving its hardness.

Figure 9:
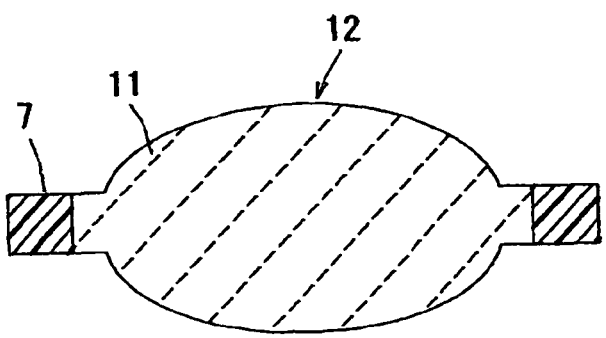
FIG. 9 is a cross-sectional view of a formed optical element.

With reference to FIG. 9, it is noted, that after the optical element 12 is molded, the optical element 12 has an optical element ring portion that is radially disposed apart from and surrounds the optical axis and is integrally formed with the optical element lens portion. As a result of molding, the ring-shaped frame-like mold member 7 is radially disposed apart from and surrounds the optical axis and is fixedly connected to and surrounds the optical element ring portion.

In the above embodiment, there has been discussed a case where the mold member 7 is shaped into a ring and has an inner surface 7a formed flatly as shown in FIG. 2. However, in a case where the inner surface 7a of the mold member 7 is flatly formed, separation tends to occur at a demarcation section established between the mold member 7 and the ultraviolet hardening resin 9 molded inside the mold member 7.

Figure 13A:
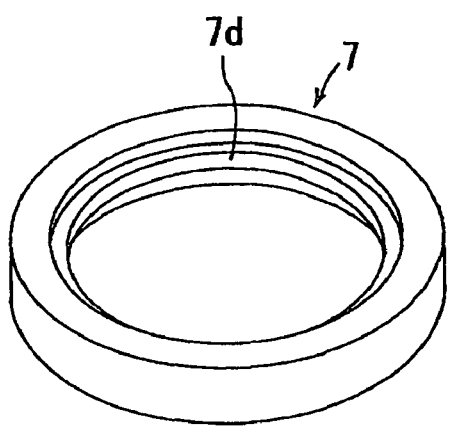
FIG. 13A is a perspective view of a third modification of the mold member.
Figure 13B:
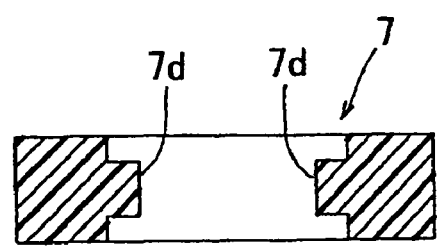
FIG. 13B is a cross-sectional view of the third modification of the mold member.

In view of the above, the mold member 7 may be indented on its inner surface to have protrusions 7b (as shown in FIG. 11). Additionally, the mold member 7 may be formed with a trench 7c (as shown in FIG. 12), a projection 7d (as shown in FIG. 13) or the like on its inner surface. With such an arrangement that the mold member 7 is formed with a projecting and depressing surface or a rough surface at its inner surface, a so-called engagement of the mold member 7 with the ultraviolet hardening resin 9 is improved so that the separation is prevented therebetween.

Figure 14:
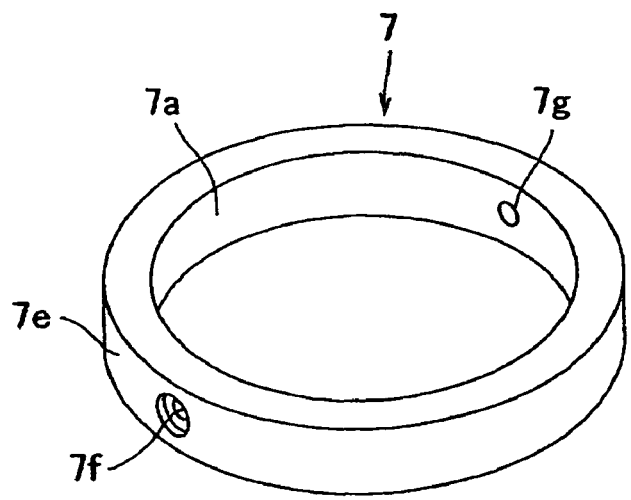
FIG. 14 is a perspective view of a fourth modification of the mold member.
Figure 15:
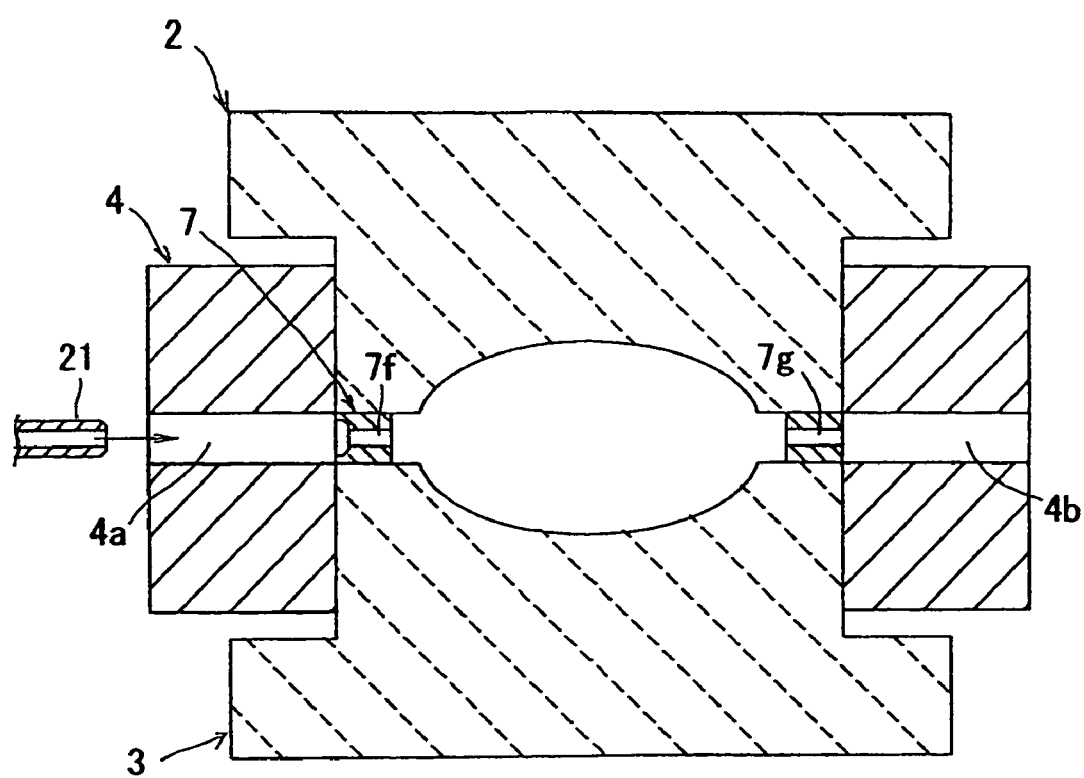
FIG. 15 is a schematic cross-sectional view showing a step taken for forming the optical element, in which the fourth modification of the mold member is used.
Figure 16:
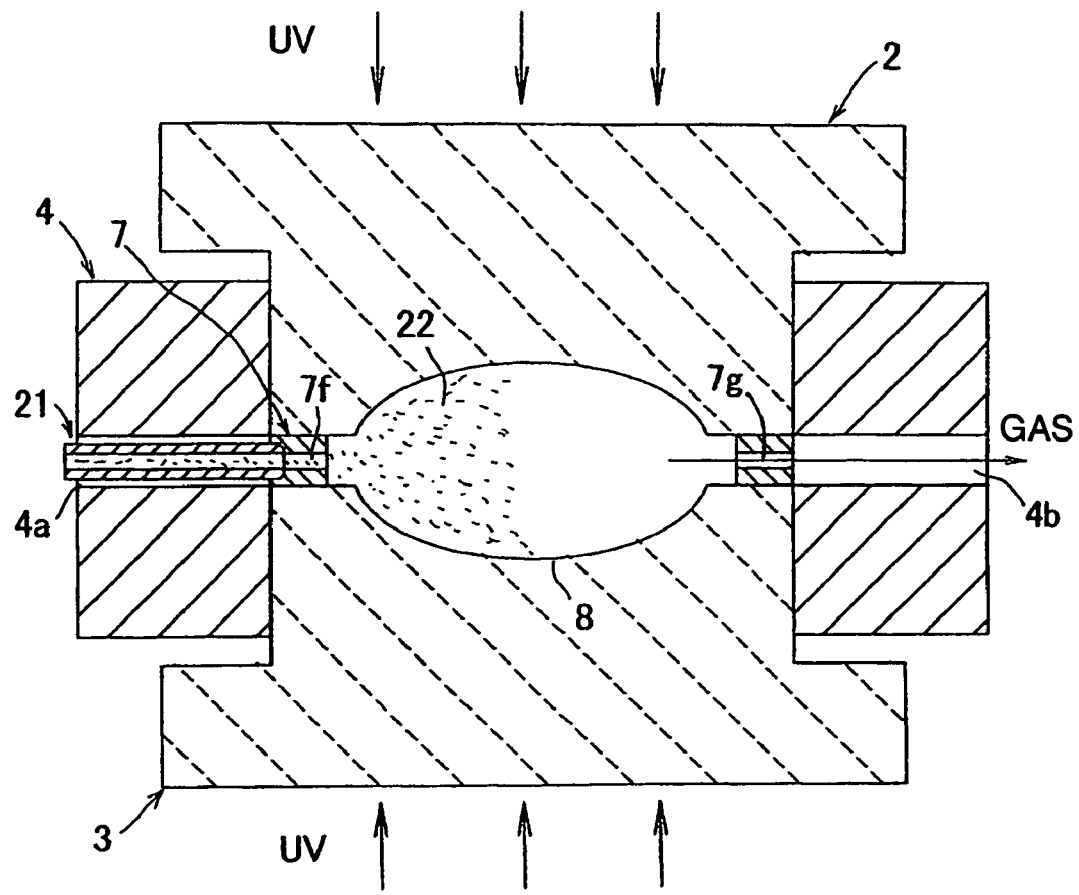
FIG. 16 is a schematic cross-sectional view showing a step taken for forming the optical element, in which the fourth modification of the mold member is used.

Further, the mold member 7 may be formed with a plurality of through-holes 7f, 7g in such a manner as to be pierced through the inner surface 7a and an outer surface 7e, as shown in FIG. 14, in which either of the through-holes 7f, 7g may serve as a resin inlet and the other may serve as an air outlet. In this case, the sleeve 4 is formed with a nozzle-insertion opening 4a and an air-discharging opening 4b which open into the through-holes 7f, 7g, respectively, as shown in FIG. 15. A resin-feeding nozzle 21 is inserted into the nozzle-insertion opening 4a as shown in FIG. 16 such that an end portion of the resin-feeding nozzle 21 is brought into contact with an entrance of the through-hole 7f. As the resin 22 is injected, air that corresponds to the resin by volume is to be discharged out of the resin injection cavity 8 through the through-hole 7g of the mold member 7 and the air-discharging opening 4b of the sleeve 4, so that the resin 22 can be smoothly poured into the resin injection cavity 8.

Figure 17:
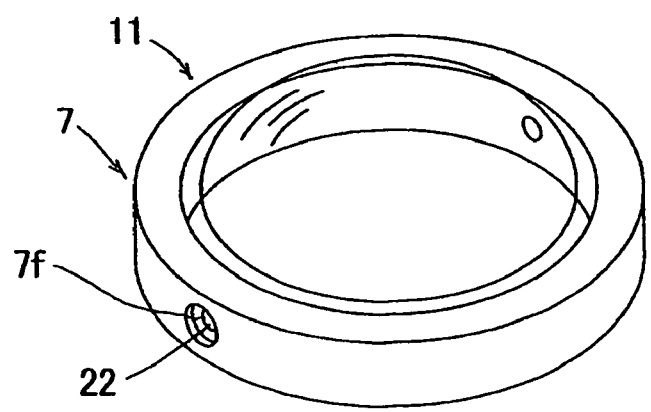
FIG. 17 is a perspective view of the optical element formed in the use of the fourth modification of the mold member.

In the formed resinous article 11 obtained by using the mold member 7 formed with the through-holes 7f, 7g in such a manner as to be pierced through the inner and outer surfaces 7a and 7e, the resin 22 partially intrudes into the through-holes 7f, 7g of the mold member 7 as shown in FIG. 17. This improves an integration or engagement between the formed resinous article 11 and the mold member 7.

Figure 18A:
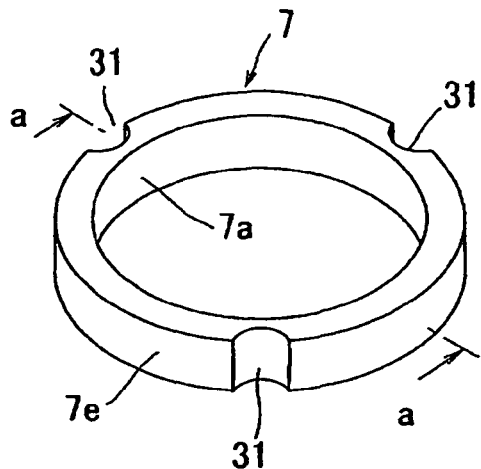
FIG. 18A is a perspective view of a fifth modification of the mold member.
Figure 18B:
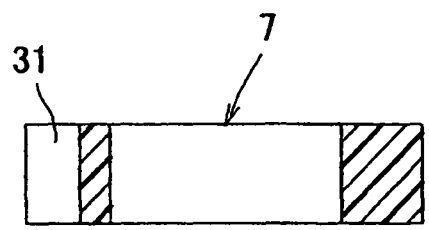
FIG. 18B is a cross-sectional view of the fifth modification of the mold member.
Figure 19:
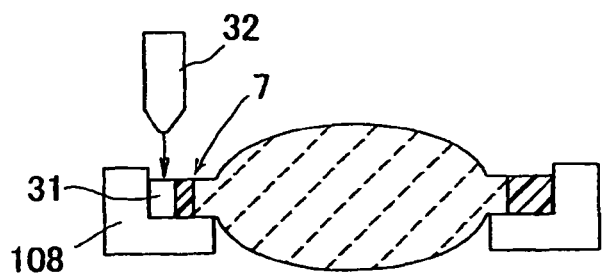
FIG. 19 is a cross-sectional view showing an effect of the fifth modification of the mold member.
Figure 20:
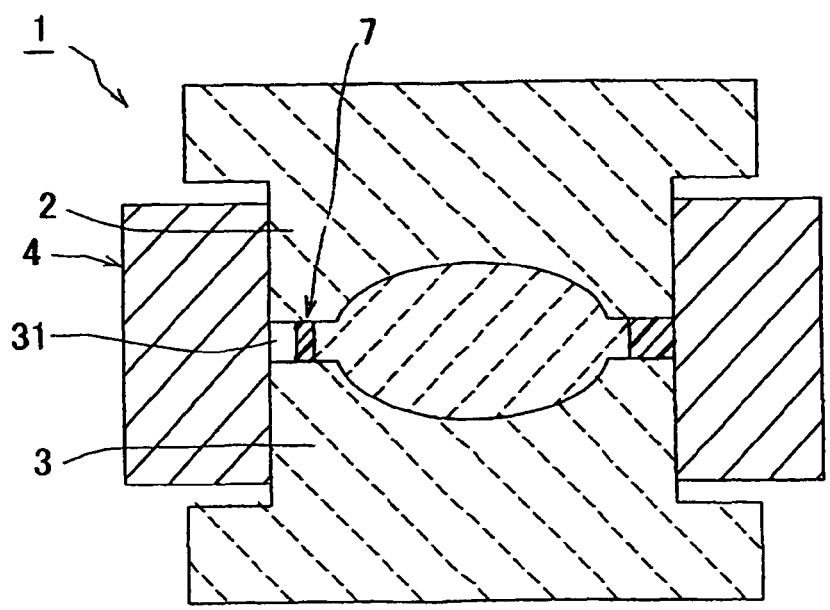
FIG. 20 is a cross-sectional view showing an effect of the fifth modification of the mold member.

FIGS. 18A and 18B show a case where the mold member 7 is formed with a plurality of grooves 31 on the outer surface 7e thereof. The grooves 31 are located at certain intervals in the circumferential direction of the mold member 7, and open through the upper and lower surface of the mold member 7. The grooves 31 may serve as adhesive-supplied sections to which an adhesive 32 is to be supplied or applied in a case where the formed resinous article 11 is bonded to a barrel 108, as shown in FIG. 19. In the absence of the grooves 31, it is sometimes difficult to release or take off the first and second forming molds 2 and 3 from the mold member 7 since the upper and lower surface of the mold member 7 are in absolute contact with the lower and upper facing surfaces of the first and second forming molds 2 and 3. However, in the presence of the grooves 31, an atmospheric pressure section is formed among the mold member 7 and the lower and upper facing surfaces of the first and second forming molds 2 and 3 as shown in FIG. 20, thereby facilitating the release of the first and second forming molds 2 and 3 from the mold member 7.

Figure 21:
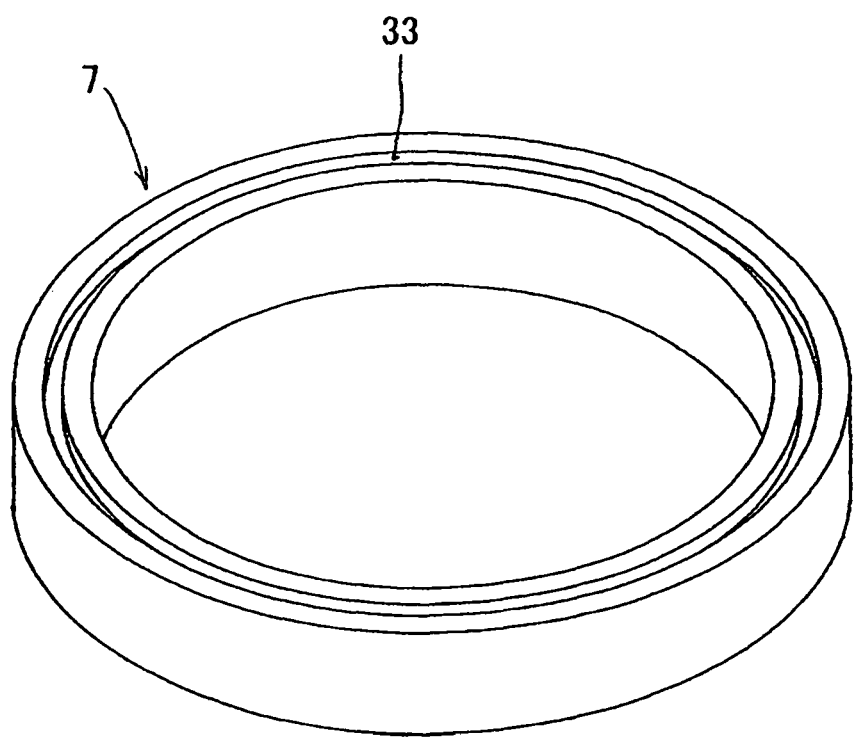
FIG. 21 is a perspective view of a sixth modification of the mold member.
Figure 22:
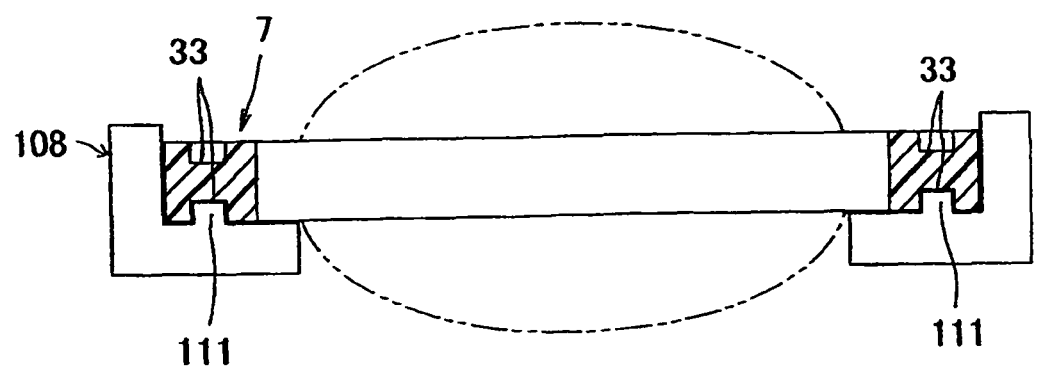
FIG. 22 is a cross-sectional view showing an effect of the sixth modification of the mold member.

FIG. 21 shows a case where the mold member 7 is formed with an annular recess 33 at the upper or lower surfaces. The barrel 108 is formed having a locational prominence 111 which is to be fitted into the annular recess 33 of the mold member 7 to locate the optical element with respect to the barrel 108 as shown in FIG. 22. The mold member 7 may be formed with two or more annular recess 33 concentrically arranged into a so-called labyrinth.

Figure 23:
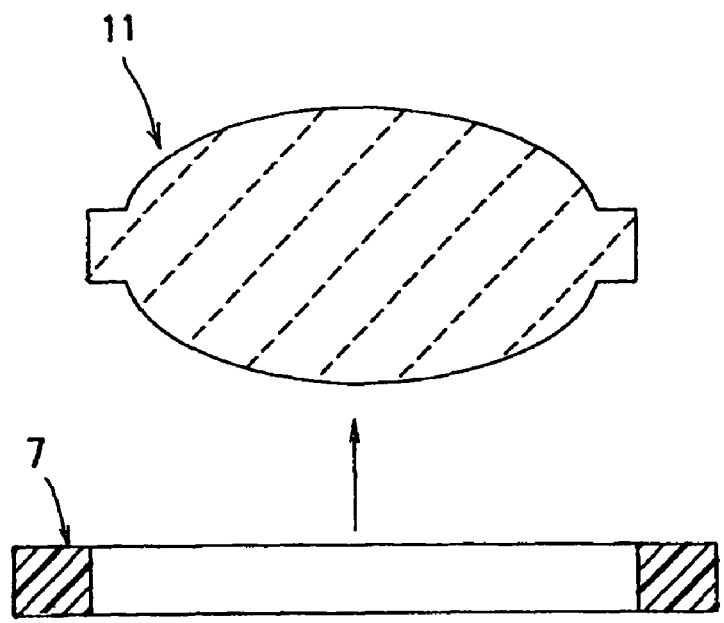
FIG. 23 is a cross-sectional view showing a state in which a formed resinous article is released from the mold member.
Figure 24:
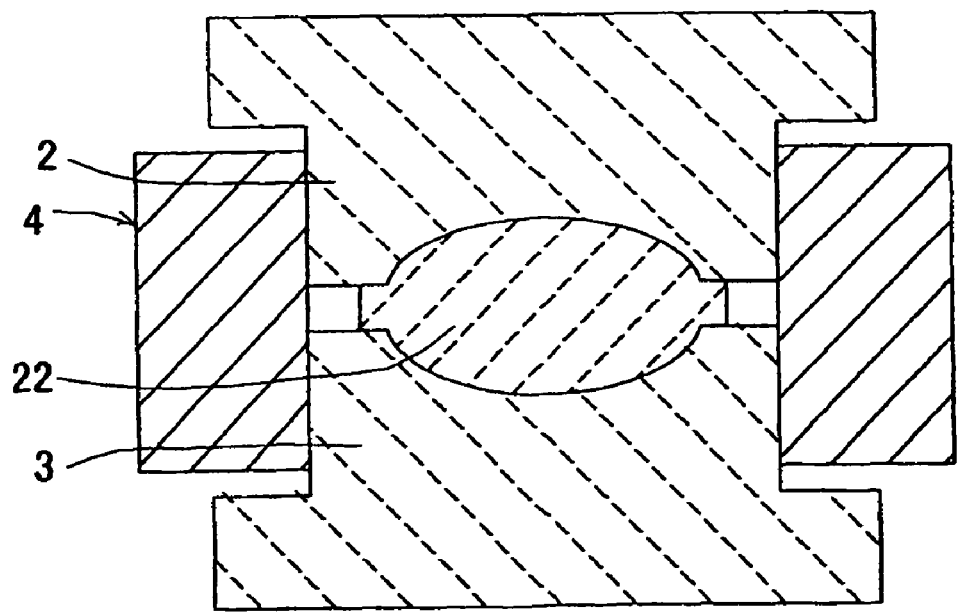
FIG. 24 is a cross-sectional view showing a case where the resin is so hardened as not to reach an outer peripheral portion of a cavity.

In the above embodiment, there has been discussed a case where the mold member 7 is formed integral with the formed resinous article 11. However, the formed resinous article 11 may be removed from the mold member 7 as shown in FIG. 23 after being formed inside the mold member 7. This method is applied in a case where the resin to be hardened is not fully filled into the cavity defined by the first and second forming molds 2 and 3, i.e. where the resin is so injected as not to reach the outermost peripheral portion of the first and second forming molds 2 and 3. This method can be applied in a case where it is not necessary to insure the outer dimensions (for example, in a case where an operation for the centering is acceptable even at post processing).

Figure 25:
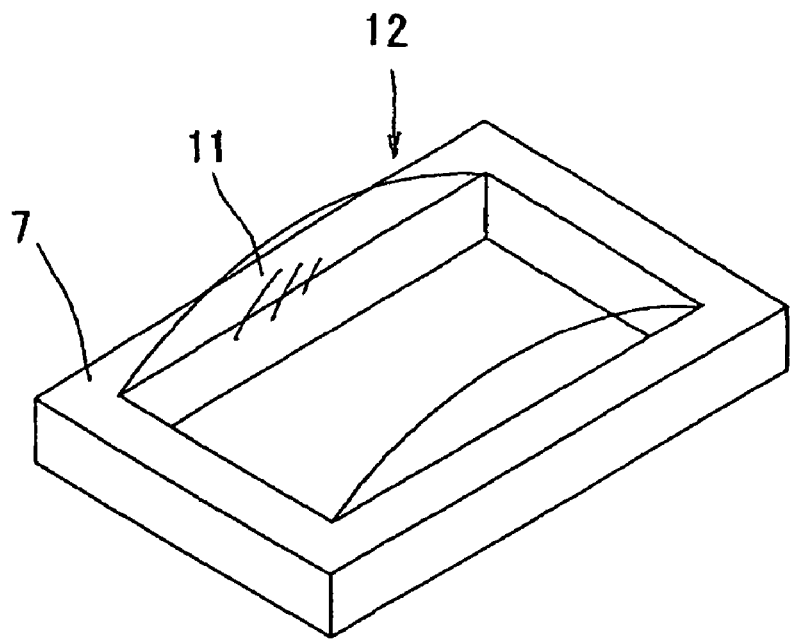
FIG. 25 is a perspective view of the mold member and the formed resinous article which are shaped into a rectangle.
Figure 26:
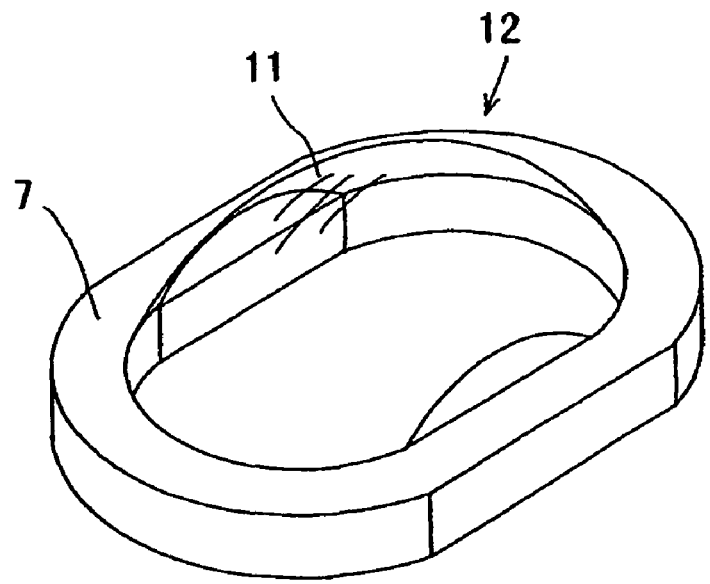
FIG. 26 is a perspective view of the mold member and the formed resinous article which are shaped such that a part of a circle is replaced by a straight line.
Figure 27:
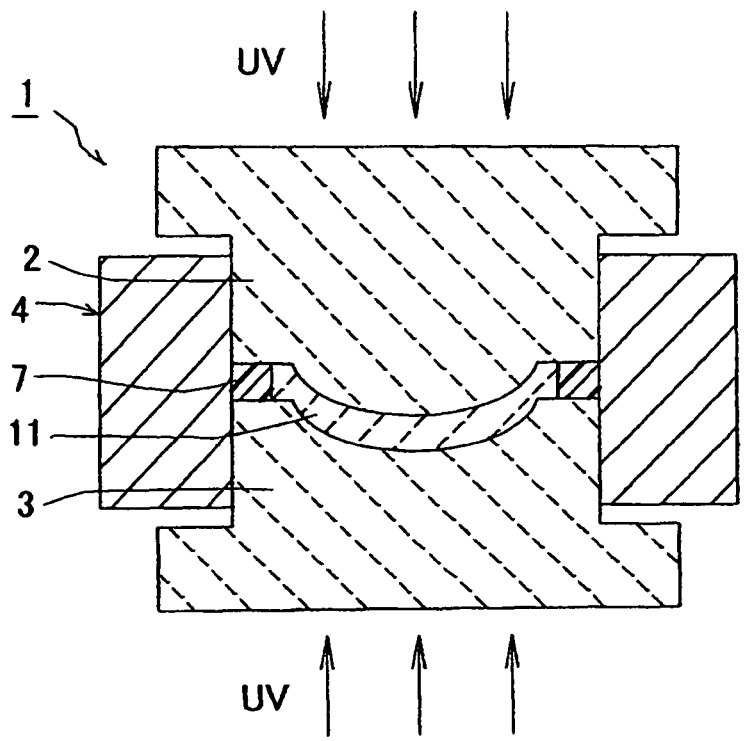
FIG. 27 is an explanatory view showing a case of forming a meniscus lens.
Figure 28:
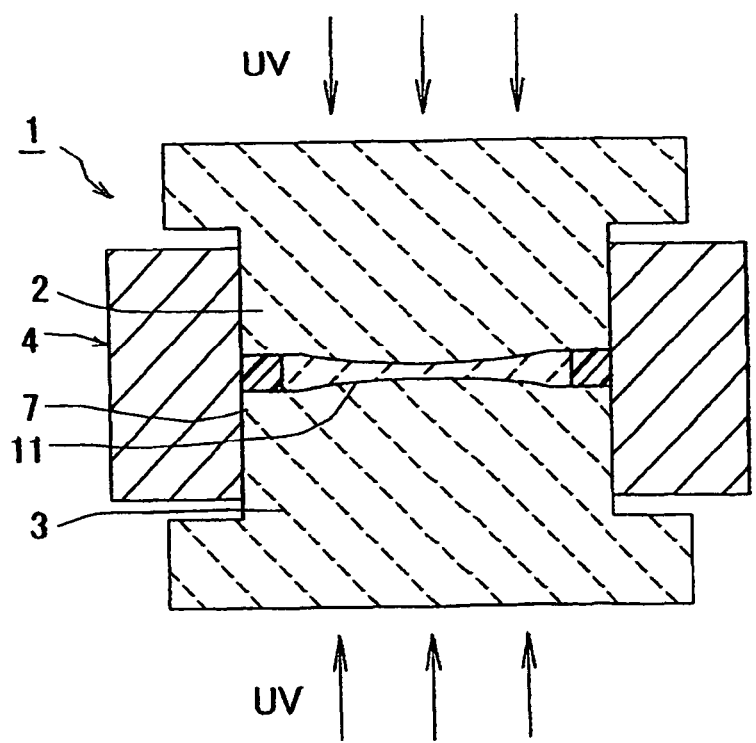
FIG. 28 is an explanatory view showing a case of forming a biconcave lens.
Figure 29:
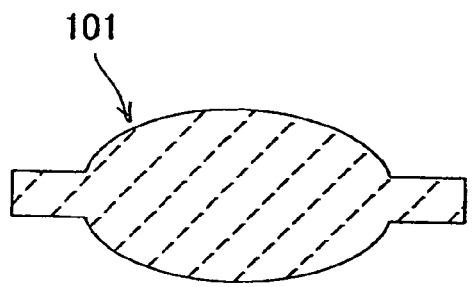
FIG. 29 is a cross-sectional view of a lens made of resin.
Figure 30:
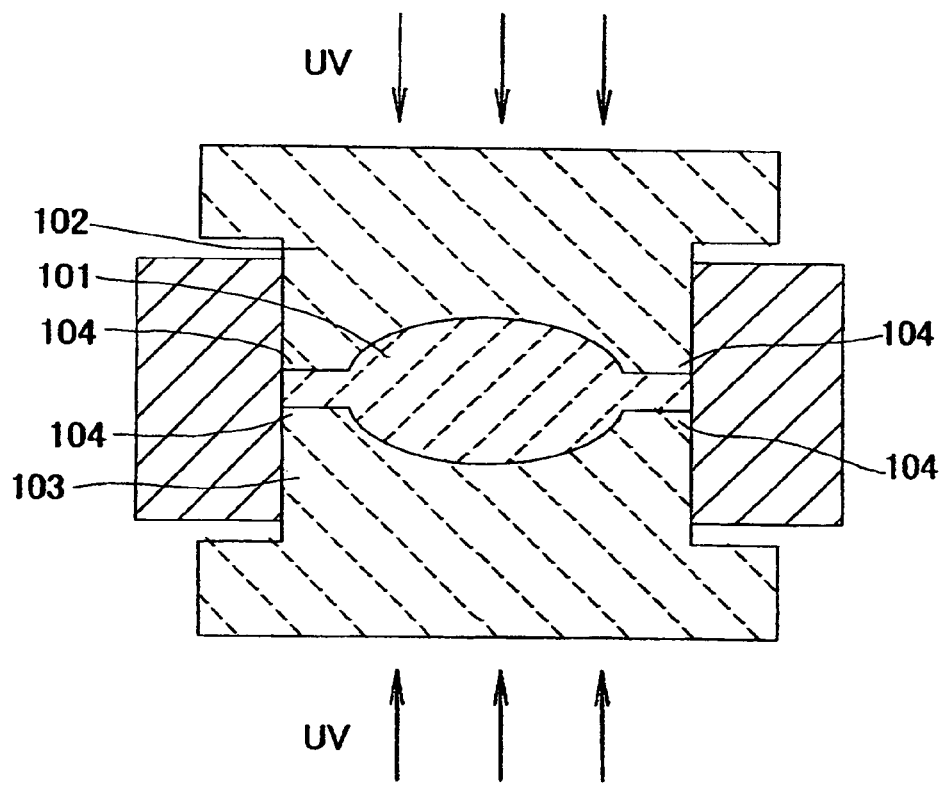
FIG. 30 is a cross-sectional view of an apparatus for forming the lens.
Figure 31:
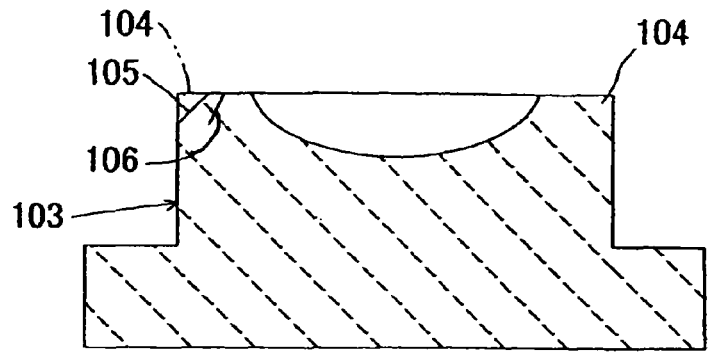
FIG. 31 is a cross-sectional view showing drawbacks encountered in a forming mold made of glass.
Figure 32:
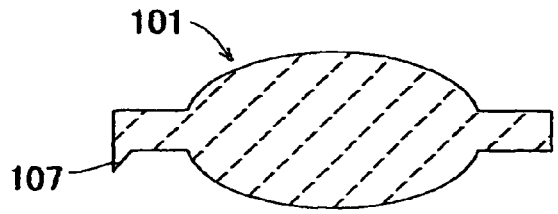
FIG. 32 is a cross-sectional view of a lens in which burrs occur.
Figure 33:
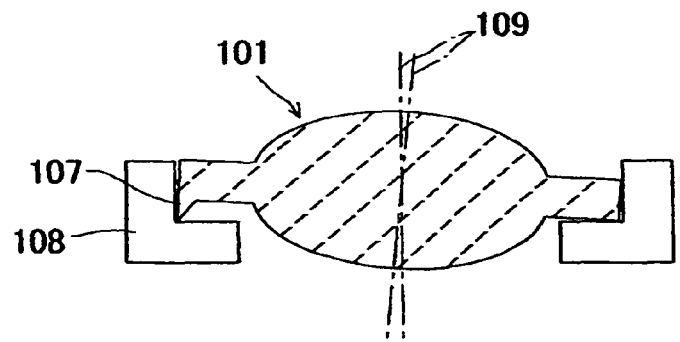
FIG. 33 is a cross-sectional view showing drawbacks encountered in the lens in which burrs occur.
Figure 34:
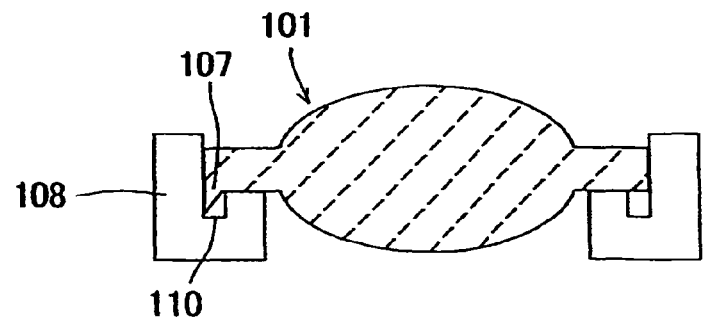
FIG. 34 is a cross-sectional view showing drawbacks encountered in the lens in which burrs occur.

There has been discussed in the above embodiment a case where the mold member 7 and the formed resinous article 11 are generally circularly formed; however, it will be understood that the mold member 7 and the formed resinous article 11 may be shaped into a rectangle or the like as shown in FIG. 25, or into such a shape that a part of the circle is replaced by a straight line as shown in FIG. 26. The shape of the mold member 7 and the formed resinous article 11 is suitably selectable in accordance with necessity of optically designing or of designing the barrel. Additionally, there has been discussed in the above embodiment a case of producing the biconvex lens; however, the above embodiment can be applied even in production of a meniscus lens or biconcave lens as shown in FIGS. 27 and 28. Further, there has been discussed in the above embodiment a case where the ultraviolet hardening resin is used as the energy hardening resin; however, the energy hardening resin is not limited to the ultraviolet hardening resin. Additionally, the forming molds are not limited to those made of glass.

Additionally, the above-discussed embodiment according to the present invention is applied to optical elements used for an image-capture portion of still cameras, digital cameras, optical pickup devices, personal digital assistants, video cameras and the like, and for projection devices, various measuring devices, signal devices and the like.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus for forming an optical element having an optical element lens portion extending along and radially about an optical axis, the apparatus comprising:

a sleeve having a sleeve inner surface defining a sleeve hole formed through the sleeve and extending along and about a sleeve hole axis;

a pair of forming molds each of which has a concave surface and a flat facing surface surrounding the concave surface with respective ones of the concave surfaces and the facing surfaces facing each other when disposed inside the sleeve hole, at least one of the pair of the forming molds being fabricated from glass to allow an ultraviolet hardening energy to pass through itself, each one of the pair of forming molds being slidably received in the sleeve hole in a close-fitting relationship, respective ones of the flat facing surfaces extending perpendicularly relative to and inwardly towards the sleeve hole axis at a distance D1; and a ring-shaped frame-like mold member interposed between the facing surfaces of the pair of the forming molds inside of the sleeve hole, the ring-shaped frame-like mold member sized to be slidably received in the sleeve hole in a close-fitting relationship and having an outer peripheral surface, an inner peripheral surface and a pair of mold member flat surfaces extending between and interconnecting the outer and inner peripheral surfaces, the outer peripheral surface extending parallel to the sleeve hole axis and being in sliding contact with the sleeve inner surface, the inner peripheral surface extending parallel to the sleeve hole axis and being disposed inwardly towards the sleeve hole axis from the outer peripheral surface at a distance D2 to define a mold member hole formed though the ring-shaped frame-like mold member and extending along and about the sleeve hole axis and respective ones of the mold member flat surfaces extending perpendicularly relative to the sleeve hole axis and being in facial contact with respective ones of the flat facing surfaces;

wherein an energy hardening resin is filled into the cavity and then hardened by being subjected to the hardening energy passing through the at least one of the pair of the forming molds and wherein the distance D2 is less than the distance D1 so that, after the optical element is molded, the optical element has an optical element ring portion radially disposed apart from and surrounding the optical axis and being integrally formed with the optical element lens portion and, as a result of molding, the ring-shaped frame-like mold member being radially disposed apart from and surrounding the optical axis is fixedly connected to and surrounds the optical element ring portion.

2. The apparatus for forming an optical element, as claimed in claim 1, wherein the mold member is made of a resin having compatibility with the energy hardening resin.

3. The apparatus for forming an optical element, as claimed in claim 1, wherein the mold member includes a projecting and depressing portion on its inner peripheral surface.

4. The apparatus for forming an optical element, as claimed in claim 1, wherein the mold member is formed with a plurality of through-holes in a manner to be pierced through its inner and outer peripheral surfaces.

5. A method for forming an optical element in an optical element forming apparatus, the optical element having an optical element lens portion extending along and radially about an optical axis, the optical element forming apparatus including:

a sleeve having a sleeve inner surface defining a sleeve hole formed through the sleeve and extending along and about a sleeve hole axis;

a pair of forming molds each of which has a concave surface and a flat facing surface surrounding the concave surface with respective ones of the concave surfaces and the facing surfaces facing each other when disposed inside the sleeve hole, at least one of the pair of the forming molds being fabricated from glass to allow an ultraviolet hardening energy to pass through itself, each one of the pair of forming molds being slidably received in the sleeve hole in a close-fitting relationship, respective ones of the flat facing surfaces extending perpendicularly relative to and inwardly towards the sleeve hole axis at a distance D1; and a ring-shaped frame-like mold member interposed between the facing surfaces of the pair of the forming molds to cover an outer peripheral portion that each of the forming molds has on its facing surface, thereby defining a cavity inside of the sleeve hole, the ring-shaped frame-like mold member sized to be slidably received in the sleeve hole in a close-fitting relationship and having an outer peripheral surface, an inner peripheral surface and a pair of mold member flat surfaces extending between and interconnecting the outer and inner peripheral surfaces, the outer peripheral surface extending parallel to the sleeve hole axis and being in sliding contact with the sleeve inner surface, the inner peripheral surface extending parallel to the sleeve hole axis and being disposed inwardly towards the sleeve hole axis from the outer peripheral surface at a distance D2 to define a mold member hole formed though the ring-shaped frame-like mold member and extending along and about the sleeve hole axis and respective ones of the mold member flat surfaces extending perpendicularly relative to the sleeve hole axis and being in facial contact with respective ones of the flat facing surfaces with the distance D2 being less than the distance D1 so that, after the optical element is molded, the optical element has an optical element ring portion radially disposed apart from and surrounding the optical axis and being integrally formed with the optical element lens portion and, as a result of molding, the ring-shaped frame-like mold member being radially disposed apart from and surrounding the optical axis is fixedly connected to and surrounds the optical element ring portion, the method comprising the steps of:

preparing a pair of forming molds each of which has a facing surface facing each other, at least one of the pair of the forming molds allowing a hardening energy to pass through itself;

interposing a mold member between the facing surfaces of the pair of the forming molds in a manner that each bottom surface of the mold member covers an outer peripheral portion that each of the forming molds has on its facing surface, thereby defining a cavity;

filling an energy hardening resin into the cavity; and hardening the energy hardening resin by applying the ultraviolet hardening energy thereto, thereby forming a formed resinous article inside the frame-like mold member.

6. The apparatus for forming an optical element, as claimed in claim 1, wherein the optical element ring portion is rectangularly shaped as viewed in cross-section.

7. The apparatus for forming an optical element, as claimed in claim 1, wherein the ring-shaped frame-like mold member is rectangularly shaped as viewed in cross-section.

8. The apparatus for forming an optical element, as claimed in claim 1, wherein the optical element ring portion is rectangularly shaped as viewed in cross-section and has an optical element ring portion thickness extending parallel to the optical axis, the ring-shaped frame-like mold member is rectangularly shaped as viewed in cross-section and has a ring-shaped frame-like mold member thickness extending parallel to the optical axis, the optical element ring portion thickness and the ring-shaped frame-like mold member thickness being at least substantially identical to each other.

* * * * *